Aug. 4, 1959   H. M. GEYER   2,897,786
TWIN ACTUATOR ASSEMBLY
Filed Dec. 10, 1954   2 Sheets-Sheet 2
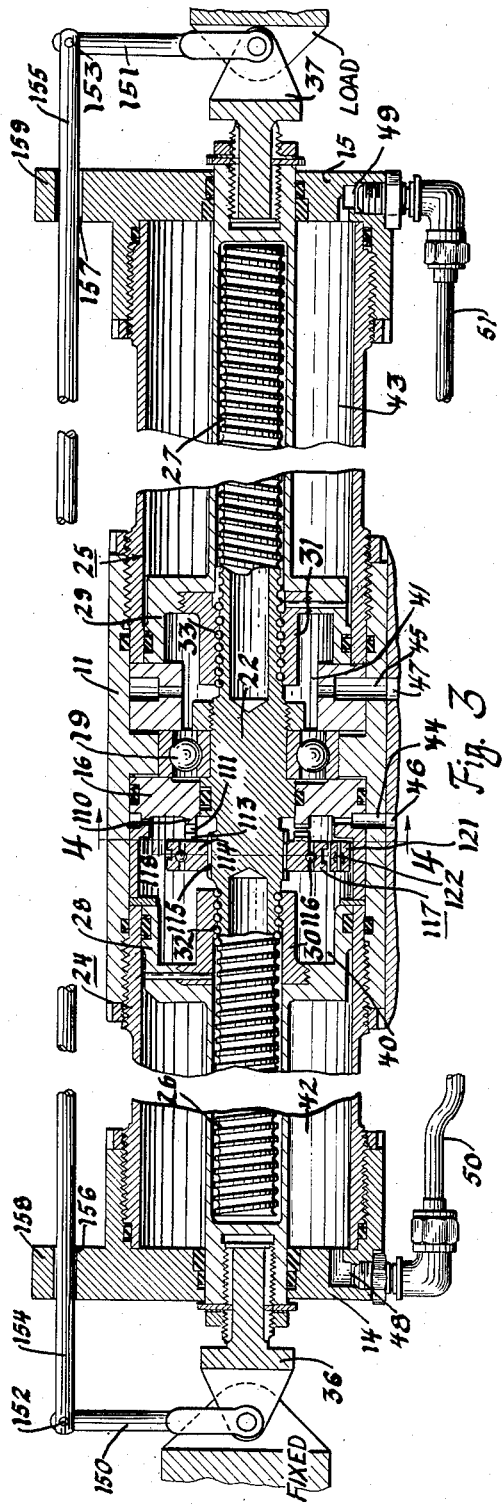
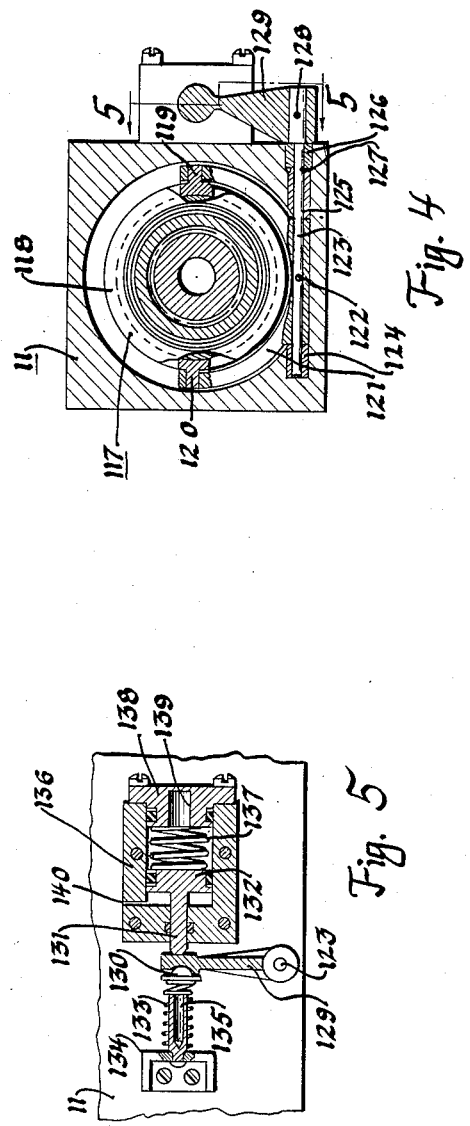
INVENTOR.
Howard M. Geyer
BY Craig V. Morton
His Attorney

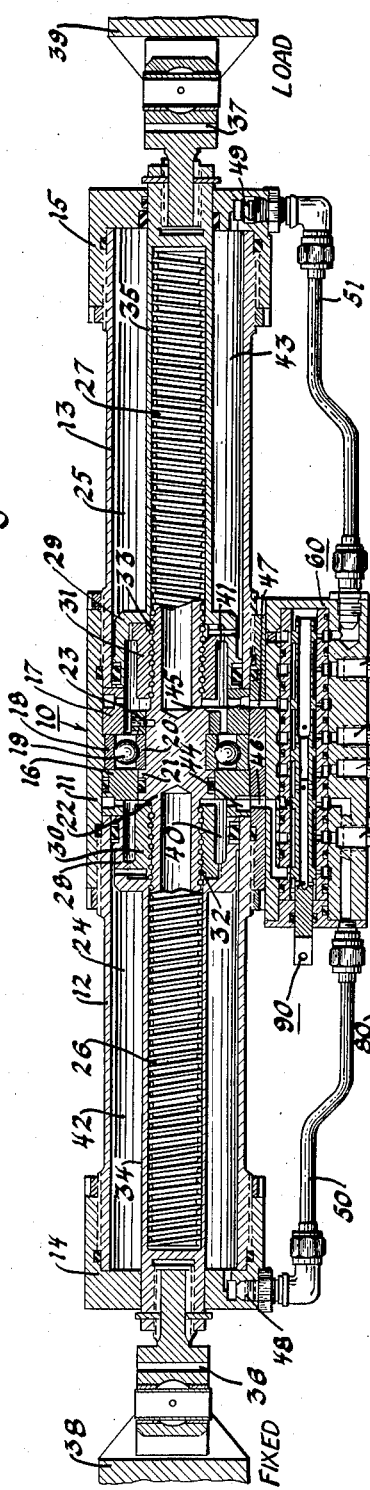

United States Patent Office 2,897,786
Patented Aug. 4, 1959

2,897,786

TWIN ACTUATOR ASSEMBLY

Howard M. Geyer, Dayton, Ohio, assignor to General Motors Corporation, Detroit, Mich., a corporation of Delaware Application December 10, 1954, Serial No. 474,540

4 Claims. (Cl. 121—40)

This invention pertains to fluid pressure operated actuators, and particularly to a twin actuator assembly.

Heretofore, it has been customary in aircraft actuator installations to employ two actuators for moving a single control surface, the actuators being operable from independent power sources so that failure of one power source will not render the aircraft uncontrollable. Thus, if the actuators are operated by fluid under pressure, the actuator cylinder and pistons are rigidly interconnected for synchronous movement, each actuator being controlled by a separate valve from a separate source of fluid pressure. This invention relates to an actuator assembly for this type of installation embodying a unitary cylinder assembly and one control valve, thereby appreciably reducing the size of the installation without sacrificing any of its advantages. Accordingly, among my objects are the provision of a twin actuator assembly which may be operated simultaneously from two power sources, or independently from either power source; the further provision of an actuator assembly including a divided cylinder having a pair of interconnected pistons disposed therein and operatively connected for relative simultaneous movement in opposite directions; the further provision of an actuator assembly of the aforesaid character including releasable locking means; and the still further provision of a twin hydraulic actuator assembly including a unitary valve for controlling operation thereof.

The aforementioned and other objects are accomplished in the present invention by incorporating a bulkhead, or partition, in the actuator cylinder which divides the cylinder into two actuator compartments. Specifically, the actuator assembly includes a cylindrical housing having threaded and sealing engagement with a pair of oppositely extending tubular members. The cylindrical housing includes a bulkhead comprising a pair of plates having a ball bearing assembly disposed therebetween. The ends of the tubular members are closed so that the bulkhead divides the assembly into two compartments. Each compartment has disposed therein a piston capable of fluid pressure actuation in both directions, each piston having a rod that extends through the closed end of its respective tubular member. The pistons carry nuts that engage oppositely threaded portions of a centrally disposed screw shaft which is rotatably supported in the bulkhead bearing assembly. In this manner, the pistons are connected for relative simultaneous movement in opposite directions.

One of the piston rods is arranged for connection to a fixed support, and the other piston rod is arranged for connection to a movable load device. Thus, one of the pistons is fixed, the other piston is movable throughout a predetermined stroke, and the cylinder moves throughout half the stroke of the movable piston. The cylinder has attached thereto a valve body within which a reciprocable plunger type valve is disposed. The valve body includes a pair of pressure supply ports, a pair of drain ports and four control ports. Two control ports are connected to each actuator cylinder on opposite sides of the piston disposed therein. Moreover, in the actuator installation, the supply and drain ports are connected to independent pressure sources, the plunger valve including a plurality of spaced lands are arranged so that upon movement thereof from a neutral position, fluid under pressure will be admitted simultaneously to either the retract or extend chambers of both actuators. If only one pressure source is operable, the twin actuator assembly can nevertheless be moved throughout its full stroke in either direction by means of fluid under pressure from the operative fluid pressure source.

In a modified embodiment, the twin actuator assembly incorporates releasable locking means for restraining rotation of the screw shaft, and, hence, preventing actuator movement. The locking means disclosed are of the type shown in my Patent 2,660,029, and, thus, include toothed members, one of which is connected to the screw shaft and the other of which is rigidly connected with the cylindrical housing. The locking means may be released by the application of fluid pressure to a lock release cylinder, as disclosed in my aforementioned patent. In addition, the actuator assembly includes torque reacting means for preventing rotation of the cylinder when the locking means are engaged. These torque reacting means comprise a plurality of rods attached to the piston rods and slidably received in openings in the cylinder assembly. These rods prevent rotation of the cylinder assembly, and withstand the torque tending to rotate the cylinder assembly when the actuator is locked, rotation of the pistons of each acuator being prevented by reason of their connection to the load device and the fixed support.

Further objects and advantages of the present invention will be apparent from the following description, reference being had to the accompanying drawings wherein preferred embodiments of the present invention are clearly shown, and wherein similar reference characters denote similar parts throughout the several views.

In the drawings:

Fig. 1 is a complete view illustrating an actuator installation and depicting a longitudinal sectional view of a twin actuator assembly constructed according to this invention.

Fig. 2 is an enlarged sectional view of the twin actuator control valve assembly.

Fig. 3 is a fragmentary sectional view of a modified twin actuator assembly including releasable locking means.

Fig. 4 is a view, partly in section and partly in elevation, taken along line 4—4 of Fig. 3.

Fig. 5 is a view, partly in section and partly in elevation, taken along line 5—5 of Fig. 4.

With particular reference to Fig. 1, the twin actuator assembly of this invention includes a cylinder assembly generally designated by the numeral 10. The cylinder assembly includes an intermediate cylindrical housing 11 having oppositely extending internally threaded portions which sealingly receive a pair of tubular members 12 and 13. The tubular members 12 and 13 extend in opposite directions and have their outer ends closed by cap members 14 and 15, respectively, the cap members threadedly and sealingly engaging the tubular members 12 and 13. The cylindrical housing 11 includes an intermediate bulkhead assembly comprising spaced annular members 16 and 17 between which the outer race 18 of a ball bearing assembly 19 is disposed. The annular members 16 and 17, as well as the bearing assembly 19, are maintained in fixed relation relative to the cylindrical housing 11 by the tubular members 12 and 13 which engage opposed surfaces thereof. The inner race 20 of the ball bearing assembly 19 is disposed between a shoulder 21 of a screw shaft assembly 22 and a collar 23, which is fixedly attached to the screw shaft assembly. Thus, the ball bearing assembly 19 rotatably supports the screw shaft 22 within the cylindrical housing 11. Furthermore, the annular members 16 and 17 together with the screw shaft 22 divide the cylinder assembly 10 into two actuator compartments, generally designated by numerals 24 and 25.

The screw shaft 22 includes oppositely extending, oppositely threaded portions 26 and 27, which are disposed in compartments 24 and 25, respectively. Preferably, although not necessarily, the screw shaft portions 26 and 27 may be formed with spiral grooves of semi-circular cross section and thereby constitute components of well known ball-screw and nut couplings.

A generally cup-shaped piston 28 is disposed within compartment 24, the piston having rigidly attached thereto a nut 30 formed with a complementary spiral groove of semi-circular cross section. The nut 30 threadedly engages the screw shaft portion 26 through the agency of a plurality of balls 32 which are free to circulate through passage means in the nut, not shown, as is conventional in ball-screw and nut couplings. The piston 28 includes a longitudinally extending, centrally recessed rod 34, into which screw shaft portion 26 extends and which extends through the end cap 14 and is attached to a suitable fixture 36, which is arranged to be connected to a fixed support designated by the numeral 38. The piston 28 divides the compartment 24 into an extend chamber 40 and a retract chamber 42. The extend chamber 40 is connected by an annular row of circumferentially spaced ports 44 in the annular member 16 to a port 46 in the cylindrical housing 11. The retract chamber 42 is connected to a port 48 in the end 14, which communicates with a conduit 50.

In a similar manner, the screw shaft portion 27 disposed in the compartment 25 includes a spiral groove of semi-circular cross section, this screw shaft portion threadedly engaging a nut 31 fixedly attached to a reciprocable piston 29 through the agency of a plurality of circulating balls 33. The piston 29 also includes an integral, longitudinally extending, centrally recessed rod 35 that extends through end cap 15 and has attached thereto a suitable fixture 37, which is arranged to be attached to a relatively movable load device, designated by the numeral 39. The piston 29 divides the compartment 25 into an extend chamber 41 and a retract chamber 43. The extend chamber 41 is connected through an annular row of circumferentially spaced ports 45 in the annular member 17, which communicate with a port 47 in the cylindrical housing 11. The retract chamber 43 is connected to a port 49 in the end cap 15 which communicates with a conduit 51.

By reason of the pistons 28 and 29 being interconnected by the screw shaft assembly 22, and, in particular, with the opositely threaded portions 26 and 27 thereof, it will be apparent that the pistons 28 and 29 of the twin actuator assembly will be constrained for relative simultaneous movement in opposite directions. It will further be appreciated that movement of the pistons relative to the cylinder assembly 10 is dependent upon and effects rotation of the screw shaft assembly 22 by reason of the threaded coupling between the pistons 28 and 29 and the screw shaft assembly 22. Inasmuch as the rod 34 of the piston 28 is illustrated as being connected to a fixed support, while the rod 35 of the piston 29 is shown connected to a movable load device, it will be appreciated that the piston 28 will always be maintained in a fixed position while the piston 29 can move throughout a stroke which is exactly twice the length of its compartment 25. Moreover, the entire cylinder assembly 10 can move throughout one-half the stroke of the piston 29. It will further be appreciated that by reason of the fact that the pistons 28 and 29 are mechanically coupled to the screw shaft assembly 22, movements of the pistons 28 and 29 relative to each other will of necessity be synchronized.

As alluded to hereinbefore, the instant actuator assembly is designated for an installation where two identical cylinder piston combinations have heretofore been used wherein the cylinders and pistons were mechanically connected together. In former installations, each cylinder and piston combination was actuated by a separate source of fluid pressure under the control of a separate valve. Normally, both of the cylinder and piston combinations are actuated concurrently to effect movement of the load device. However, if one of the sources of fluid pressure failed, the load device could nevertheless be moved by the single remaining operative piston and cylinder combination.

With particular reference to Figs. 1 and 2, the control valve assembly for the twin actuator assembly, depicted in Fig. 1, will be described. The control valve assembly includes a valve body 60, which is arranged to be fixedly attached to the cylindrical housing 11, as depicted in Fig. 1. The valve body 60 is formed with four control ports 61, 62, 63 and 64. Control port 61 communicates with port 47 in the cylindrical housing 11, control port 62 communicates with port 46, port 63 communicates with conduit 51, and port 64 communicates with conduit 50. The valve body 60 is formed with a cylindrical recess 65 constituting a valve chamber. A sleeve 66 is rigidly retained within the recess 65 by means of an end plate 67, which is fixedly attached to the valve body 60. The sleeve 66 is formed with a plurality of axially spaced rows of circumferentially spaced ports 68, 69, 70, 71, 72, 73, 74, and 75. The ports 68 communicate with the control port 62, the ports 69 communicate with a pressure supply port 76, the ports 70 communicate with control port 64, the ports 71 communicate with a drain port 77, the ports 72 communicate with a drain port 78, the ports 73 communicate with the control port 61, the ports 74 communicate with a pressure supply port 79, and the ports 75 communicate with the control port 63.

As depicted in Fig. 1, the pressure supply ports 76 and 79 of the valve body 60 are connected by conduits 80 and 81, respectively, to the outlet of pumps 82 and 83, respectively. The pumps 82 and 83 constitute independent pressure supply sources for each actuator of the twin actuator assembly. The pumps draw fluid from reservoirs 84 and 85, which are connected, respectively, to drain ports 77 and 78 through conduits 86 and 87, respectively.

A reciprocable plunger 90 is disposed within the sleeve 66. The plunger includes a plurality of axially spaced lands 91, 92, 93, 94 and 95. The plunger 90 is formed with a centrally disposed recess having a pin 97 disposed in an intermediate portion thereof which divides the recess into two portions 96 and 98, and blocks communication therebetween. The lands 91 and 92 of the plunger 90 control the application of fluid under pressure to the actuator compartment 24, while the lands 94 and 95 control the application of pressure fluid to the actuator compartment 25. Thus, the annular space between lands 91 and 92 communicates with the supply port 69, while the annular space between lands 94 and 95 communicates with the supply port 74. The bore 98 is connected to the annular space to the left of land 91, as viewed in Fig. 2, by an opening 100. The bore 98 is also connected to the annular space between lands 92 and 93 by an opening 102. Similarly, the recess 96 is connected to the annular space between lands 93 and 94 by an opening 99, while the open end thereof communicates with the annular space to the right of land 95, as viewed in Fig. 2.

When the plunger 90, which is manually operable, is moved to the right, as viewed in Figs. 1 and 2, fluid from pressure source 82 will flow from conduit 80 through ports 76 and 69, through ports 70 and 64 to the conduit 50 and, thence, through port 48 to the retract chamber 42 of the actuator compartment 24. At this time, the extend chamber 40 will be connected to drain through ports 44, 46, 62, 68, the opening 100, the bore 98, the opening 102, ports 71 and 77, and conduit 86. Concurrently, with the application of pressure fluid to the retract chamber 42 of the actuator compartment 24, pressure fluid will be directed to the retract chamber 43 of the actuator compartment 25 from the pressure source 83 through conduit 81, ports 79, 74, 75 and 63, conduit 51, and port 49. Similarly, the extend chamber 41 of the actuator compartment 25 will be connected to drain through ports 45, 47, 61, the opening 99, the recess 96, ports 72 and 78, and the conduit 87. When the valve plunger 90 is moved to the left, as viewed in Fig. 2, the extend chambers 40 and 41 of the actuator compartments 24 and 25, respectively, will be subjected to fluid under pressure from sources 82 and 83, respectively, while the retract chambers 42 and 43 will be connected to drain. Thus, it is apparent that the twin actuator assembly is controlled by a single valve which effects the simultaneous application of pressure fluid to the actuator chambers so as to effect relative movement of the actuator pistons in opposite directions. The twin actuator assembly is fully operable from either pressure source 82 or 83 by itself, since the pistons 28 and 29 of the actuators 24 and 25 are mechanically connected together through the screw shaft 22.

With reference to Figs. 3 through 5, a modified twin actuator assembly including releasable locking means will be described. The actuator assembly of Figs. 3 through 5 is identical to that described in connection with Fig. 1 except for the locking means, and hence, only the locking means will be described in detail. As depicted in Fig. 3, the annular partition member 16 is formed with an axially extending annular flange extension 110, which is formed with a plurality of circumferentially spaced teeth 111. The teeth 111 are arranged to engage a complementary set of circumferentially spaced teeth formed on an annular flange 113 of a ring 114, which is connected through straight splines 115 to the screw shaft 22. By reason of the straight spline connection between the screw shaft 22 and the ring 114, relative rotation therebetween is precluded while relative longitudinal movement therebetween is permitted. The locking means are constituted by the toothed edges of annular flanges 111 and 113, which type of locking means are disclosed in my aforementioned Patent 2,660,029.

The outer periphery of the ring 114 is connected through a thrust bearing assembly 116 to a ring 117 having an annular groove 118 therein, the bearing assembly 116 allowing relative rotation between the rings 117 and 114. The ring 117 constitutes a control ring, the longitudinal position of which determines whether the locking means will be engaged or disengaged. With particular reference to Fig. 4, a pair of diametrically opposed shoe members 119 and 120 are situated within the groove 118. The shoe members 119 and 120 are fixedly connected to the ends of a yoke 121, the intermediate portion of which is pinned at 122 to a shaft 123. The shaft 123 is rotatably journaled within the cylindrical housing 11 by sleeve bearing means 124, 125 and 126. Suitable sealing means 127 are interposed between sleeve bearings 125 and 126 to prevent the loss of fluid from the cylindrical housing 11 through the shaft opening.

The end of shaft 123 is pinned at 128 to a lever 129. As seen particularly in Fig. 5, the lever 129 has its end portion disposed between a thrust member 130 and the protruding rod 131 of a lock release piston 132. The thrust member 130 is urged to the right, as viewed in Fig. 5, by means of a compression spring 133, one end of which engages the member 130 and the other end of which is seated against a bracket 134, which is attached to the housing 11. A tubular spring guide 135 is attached to the bracket 134 for centering the spring 133 between its ends.

The lock release piston 132 is disposed within a lock release cylinder 136, which is attached to the housing 11. The lock release piston 132 is normally urged to the left by a compression spring 137, one end of which engages the piston 132 and the other end of which engages an end wall 138 of the cylinder 136. The end wall 138 is formed with a lock release port 139 through which pressure fluid may be admitted to effect movement of the lock release piston 132 to the left, as viewed in Fig. 5. A bleed passage 140 formed in the cylinder 136 permits the escape of any fluid which may seep past the piston 132. In the absence of fluid pressure application to the lock release cylinder through port 139, the oppositely acting springs 137 and 133 center the lever 129 so that the yoke 121 positions the ring 117 and, hence, the spring 114 so that the toothed portions of the ring 114 and the flange 110 are in engagement.

In order to prevent rotation of the cylindrical housing 11 to which the annular member 16 is connected, the fixture members 36 and 37 of each actuator 24 and 25 have attached thereto upright members 150 and 151. The member 150 is pinned at 152 to a torque reactor rod 154, which is slidably received in an opening 156 formed in an extension 158 of the end cap 14. Similarly, the upright portion 151 is pinned at 153 to a rod 155, which is slidably received in an opening 157 in an extension 159 of the cap member 15. Inasmuch as the cylinder assembly includes end caps 14 and 15, tubular members 12 and 13 and the cylindrical housing 11, which are all rigidly interconnected, the rods 154 and 155 will prevent rotation of the cylindrical housing 11 and the annular member 16 and, thus, render the locking means effective to restrain rotation of the screw shaft 22. Hence, when the locking means are engaged, movement of the pistons 28 and 29 relative to the cylinder assembly will be prevented.

The lock release port 139 may be connected in various ways to the pressure supply sources 82 and 83. If desired, the port 139 may be connected to conduits 80 and 81 so that when either or both of the pumps 82 and 83 are operating, the locking means will be released. Thus, the actuator assembly will only be locked against movement upon failure of both pressure supply sources constituted by pumps 82 and 83. However, in some installations, it may be desirable to lock the actuator assembly mechanically when it is inactive, even though the pumps 82 and 83 are operating. In this instance, the lock release port 139 would have connection with the control ports 61 through 64 of the valve body 60 so that the locking means would only be released when the valve plunger is moved so as to direct the application of fluid pressure to either chamber of either actuator. In this arrangement, whenever the valve plunger 90 is disposed in a neutral position, as depicted in Fig. 2, the pressure will be relieved at port 139 so that the oppositely acting springs 133 and 137 position the lever 129 and engage the locking means. Any suitable valving means well known to those skilled in the art may be employed so as to accomplish this result.

While the embodiments of the present invention as herein disclosed, constitute preferred forms, it is to be understood that other forms might be adopted.

What is claimed is as follows:

1. An actuating system including in combination, a fluid pressure operated twin actuator assembly comprising a cylinder, means dividing said cylinder into two compartments separated from fluid communication with each other, a piston disposed in each compartment and means operatively interconnecting said pistons for relative simultaneous movement in opposite directions, a pair of fluid pressure sources, each pressure source being connected to its own compartment, and a single valve connected between said sources and said compartments for controlling the simultaneous application of pressure fluid from said sources to said compartments so as to effect relative simultaneous movement between said pistons, said single valve also connected between each said source and each compartment for controlling individual application of pressure fluid from one operative source to one said compartment in the event of failure of the other said source for supply of pressure fluid for the other said compartment while said twin actuator assembly is fully operable from either pressure source individually due to said means operatively interconnecting said pistons for relative simultaneous movement in opposite directions.

2. An actuating system including in combination, a fluid pressure operated twin actuator assembly comprising a cylinder, means dividing said cylinder into two compartments separated from fluid communication with each other, a piston disposed in each compartment, and an element journaled in said cylinder and operatively interconnecting said pistons for simultaneous relative movement in opposite directions, means connecting one of said pistons to a fixed support, means connecting the other of said pistons to a movable load device whereby one of said pistons is fixed, the other of said pistons is movable throughout a stroke twice the length of its compartment and said cylinder movable throughout a stroke equal to the length of the fixed piston compartment, a pair of independent fluid pressure sources, each pressure source being connected to one of said compartments, and a valve connected between said pressure sources and said compartments for controlling the application of pressure fluid thereto, the construction and arrangement being such that said twin actuator assembly is fully operable from either of said pressure sources independently as well as concurrently from both of said fluid pressure sources.

3. A twin actuator assembly comprising a unitary cylinder assembly and one control valve, said unitary cylinder assembly including a cylindrical housing, an intermediate bulkhead assembly including an annular member maintained in fixed relation in said housing, a bearing means disposed adjacent said member in said housing, an element rotatably supported by said bearing means sealingly engaging said annular member, said annular member and said element dividing said housing into two actuator compartments, a piston disposed in each compartment, means operatively interconnecting said pistons and said element for relative simultaneous movement in opposite directions, means connected with said one control valve permitting said valve to control the relative simultaneous movement between said pistons, and releasable locking means including a toothed annular flange axially slidable on said element engageable with said annular member to restrain rotation of said element.

4. A twin actuating system, comprising, a unitary cylinder assembly and one control valve, said unitary cylinder assembly including a cylindrical housing, an intermediate bulkhead assembly including an annular member maintained in fixed relation in said housing, a bearing means disposed adjacent said member in said housing, an element rotatably supported by said bearing means sealingly engaging said annular member, said annular member and said element dividing said housing into two actuator compartments, a piston reciprocally disposed in and dividing each compartment into separate extend and retract chambers with corresponding separate extend and retract ports therewith, and an independent fluid pressure source for each compartment, each source being connected by said one control valve to communicate through the extend and retract ports with the chambers of one compartment, said valve controlling simultaneous application of fluid pressure to the actuator chambers so as to effect relative movement of said pistons in opposite directions.

References Cited in the file of this patent
UNITED STATES PATENTS

| | | |
|---|---|---|
| 254,741 | Walsh | Mar. 7, 1882 |
| 2,308,099 | Obecny | Jan. 12, 1943 |
| 2,387,007 | Buchanan | Oct. 16, 1945 |
| 2,500,797 | Bullard | Mar. 14, 1950 |
| 2,588,779 | Van Der Stigchel | Mar. 11, 1952 |
| 2,660,029 | Geyer | Nov. 24, 1953 |

FOREIGN PATENTS

| | | |
|---|---|---|
| 409,622 | Italy | Feb. 23, 1945 |